United States Patent

[11] 3,550,973

| [72] | Inventors | Yutaka Kitano;<br>Hiroshi Sato, Hitachi-shi; Isao Ishida,<br>Takahagi-shi, Japan |
|---|---|---|
| [21] | Appl. No. | 807,514 |
| [22] | Filed | Mar. 17, 1969 |
| [45] | Patented | Dec. 29, 1970 |
| [73] | Assignee | Hitachi, Ltd.<br>Tokyo-to, Japan |

[54] THRUST BEARING ASSEMBLY
14 Claims, 16 Drawing Figs.

| [52] | U.S. Cl. | 308/160 |
|---|---|---|
| [51] | Int. Cl. | F16c 17/06 |
| [50] | Field of Search | 308/160, 168, 172 |

[56] References Cited
UNITED STATES PATENTS
1,387,929   8/1921   Kingsbury et al. ............ 308/160

*Primary Examiner*—Fred C. Mattern, Jr.
*Assistant Examiner*—Frank Susko
*Attorney*—Craig, Antonelli, Stewart & Hill ABSTRACT: A thrust bearing assembly for use in vertical rotary machines, wherein an annular thrust member mounted on a rotor shaft is supported by a plurality of separate bearing shoes, each of which in turn is resiliently and tiltably supported by at least one shoe supporting member which is a spring plate having abutting projections on both main surfaces thereof, said shoe supporting members each being supported on a base which is finally supported on the ground, whereby a uniform load distribution over the whole surface of each bearing shoe is obtained with no high precision manufacture.

PATENTED DEC 29 1970

INVENTORS
YUTAKA KITANO
HIROSHI SATO
ISAO ISHIDA

BY Craig, Antonelli, Stewart & Hill

ATTORNEYS

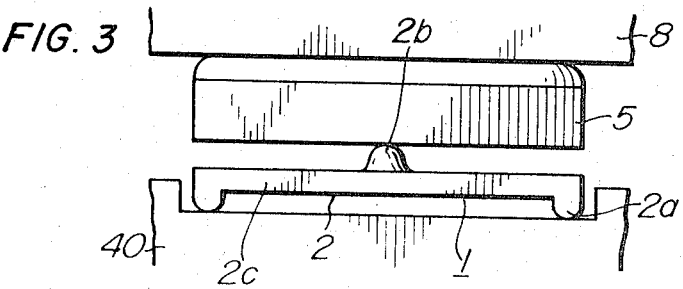
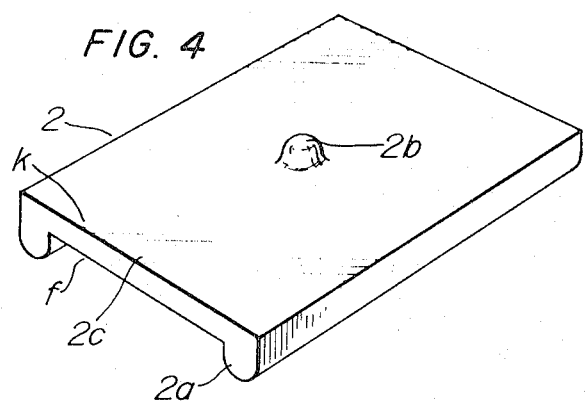
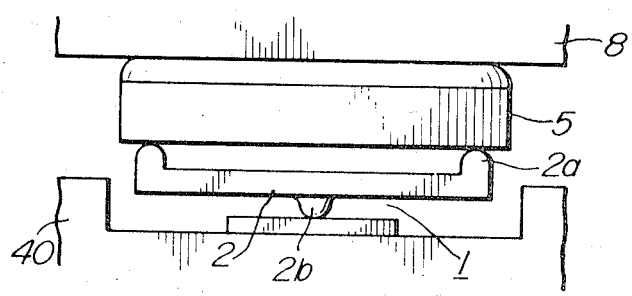
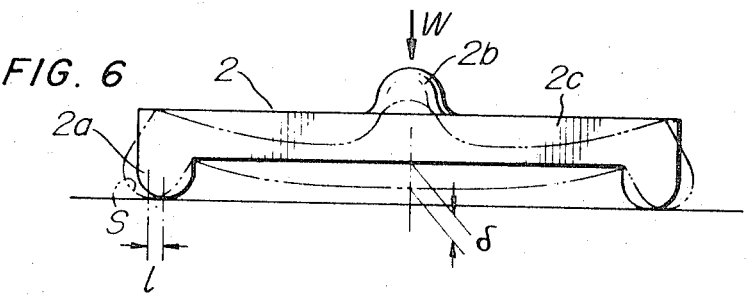

THRUST BEARING ASSEMBLY

This invention relates to a thrust bearing assembly for use in vertical rotary machines, especially large rotary machines such as a large water turbine generator.

In a heavy thrust bearing assembly for use in a large rotary machine such as a large water-turbine generator, a thrust member mounted on the rotor shaft is generally supported by a number of separate bearing shoes which are each mounted on a base in a manner to be slightly tiltable so that a wedge shaped lubricating oil film is formed between the cooperating surface of the thrust member and each bearing shoe. In the thrust bearing assembly of this type, it is desirable that all the bearing shoes are not only adapted to carry equal partial charges of the load but also adapted to carry the partial charges uniformly over the whole surfaces thereof. Furthermore, it is particularly desirable that the above-mentioned conditions are satisfied not only during the operation of the machine but also at the time of starting when sufficient oil films are not yet formed in order to avoid the occurrence of such a large local contact pressure on the shoe surfaces that causes damages of the shoe surfaces. Uniform distribution of the load is also desirable in the view point of avoiding deformation of the bearing shoes or at least minimizing such deformation.

In a small thrust bearing assembly, the bearing shoes are each generally supported by a firmly fixed supporting pin. However, if a heavy thrust load in a large or heavy thrust bearing is supported by such supporting pins, there is a danger that a high stress concentration is caused in the supporting pins and therefore, such a structure is undesirable and sometimes even unallowable for a large thrust bearing. Accordingly, in a large thrust bearing assembly, each bearing shoe must be independently and tiltably supported by an independent shoe supporting means in a manner that all bearing shoes carry equal partial charges of the load.

In a known thrust bearing assembly, each bearing shoe is attached with a disc arranged thereunder and the disc is supported at its undersurface by a point support to attain the above-mentioned purpose. Although this structure is satisfactory in obtaining the above-mentioned effects, it is relatively weak and cannot be applied to a large or heavy thrust bearing assembly. In addition, as the bearing becomes larger and accordingly the number of separate bearing shoes is increased, each bearing shoe will have a plane shape of a relatively elongated rector, and therefore, the longitudinal end portions of the shoe cannot be sufficiently supported, whereby the shoe will be deflected due to its own weight and the thrust load, thus making it difficult to obtain uniform load distribution over the whole surface of the shoe.

It is advantageous to support a bearing shoe at a plurality of points arranged therealong when the shoe has an elongated plane shape as in the case of a large thrust bearing. However, such a multiple supporting requires that the respective constitutional elements are manufactured with a relatively high precision, and in addition the work of assembling the same is rather laborious including a large quantity of manual finishing. Since all the bearing shoes must be installed at a precisely same level to uniformly distribute the load over the whole shoes, the adjustment of a plenty of supporting points includes very difficult and laborious works.

To avoid these difficulties, it is also known to use a coil spring or a coned disc spring as a shoe supporting member. However, though these springs are effectively used in small or medium-type thrust bearings, they cannot be used in heavy thrust bearings because they are too weak to support such a heavy load as is encountered in heavy thrust bearings.

Accordingly, it is an object of this invention to provide a thrust bearing assembly for use in vertical rotary machines, wherein the bearing shoes which are separated into a number of sectors or elongated sectors in order to carry a heavy thrust load are resiliently and tiltably supported in a manner that the load is uniformly distributed over the whole surfaces of the bearing shoes.

Another object of this invention is to provide a large or heavy thrust bearing assembly of the above-mentioned type which can operate satisfactorily even under the application of a heavy thrust load.

Still another object of this invention is to provide a thrust bearing assembly of the above-mentioned type which is easy in manufacture and assembly and requires no high precision manufacture.

These objects are attained, according to this invention, by a thrust bearing assembly for use in vertical rotary machines, comprising an annular thrust member mounted on a rotor shaft of the machine, a plurality of separate bearing shoes adapted to cooperate with and slidingly support said thrust member, and a plurality of shoe supporting members for supporting said bearing shoes against a base finally supported on the ground, each one of said bearing shoes being supported by at least one of said shoe supporting members, characterized in that said shoe supporting member is a spring plate having leg projections on one main surface and at opposite ends thereof and a central projection on the other main surface and at a central portion thereof.

In the accompanying drawing;

FIG. 3 is an enlarged partial front view of a shoe assembly in the thrust bearing assembly seen in the direction of arrowhead Q in FIG. 1;

FIG. 4 is a perspective view of a shoe supporting member according to this invention;

FIG. 5 is a view of the same kind as FIG. 3, showing another embodiment of the shoe assembly;

FIG. 6 is an explanatory FIG. of the shoe supporting member showing the deflection of the member due to a load;

In the following, the present invention will be explained in detail by way of some preferred embodiments with reference to the accompanying drawing.

Figure 1:
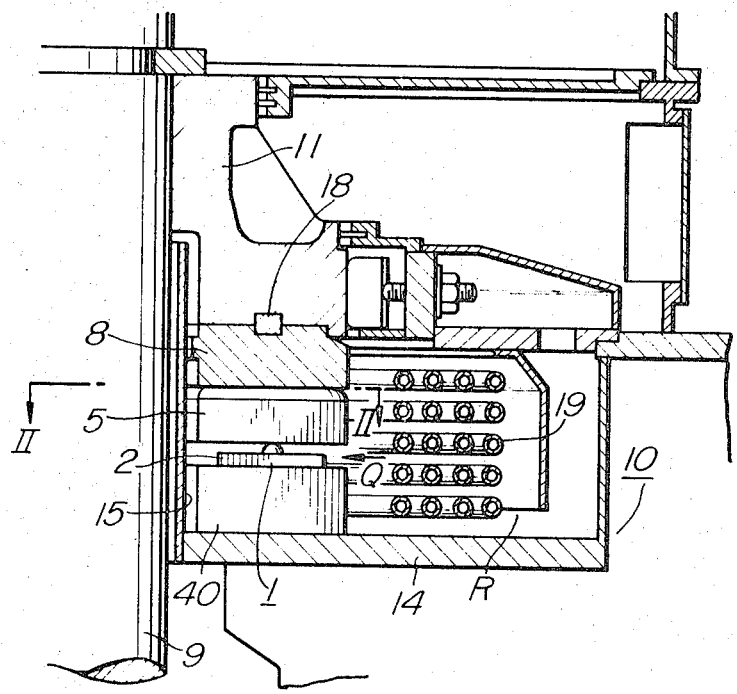
FIG. 1 is a partial axial section of a thrust bearing assembly according to this invention.
Figure 2:
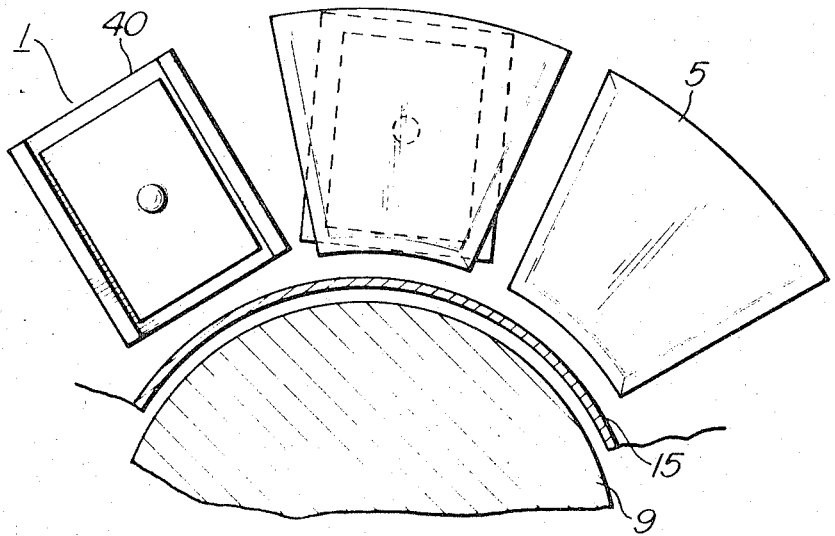
FIG. 2 is a partial cross section of the thrust bearing assembly taken along line II–II in FIG. 1.

Referring to FIGS. 1 and 2, there is partially shown an essential portion of a thrust bearing assembly of a large generator, e.g. water turbine generator, wherein a rotor shaft 9 of the generator is supported against its axially downward movement by a shoe assembly generally designated by reference numeral 1 which is mounted in a housing assembly generally designated by reference numeral 10.

The rotor shaft 9 which is carrying a rotor (not shown) at its upper portion is provided with a thrust collar 11 which is either formed integral with the rotor shaft or separately manufactured and mounted onto the shaft by shrinking, etc. finally to form a unitary member therewith. In addition, a thrust runner 8 is mounted at the underside of the collar 11 and locked against relative rotation with respect to the collar by keys 18 or other proper means. The thrust bearing assembly, especially the shoe assembly is supported on a firm support means, e.g. a concrete base (not shown) which also supports a stator of the generator.

The housing assembly 10 defines an annular oil chamber R around the shoe assembly 1, the inner periphery thereof being bounded by a cylindrical wall 15 positioned spaced around the outer periphery of the rotor shaft 9. The oil chamber R is filled with a lubricating oil to lubricate the shoe assembly 1 which is mounted on a bottom 14 of the oil chamber. Heat exchanger tubes 19 are mounted in the oil chamber R for the purpose of cooling the lubricating oil.

The shoe assembly 1 is substantially composed of a plurality of bearing shoes 5, the same or other plurality of shoe supporting members 2 and an annular base 40. The bearing shoes 5 are each having a plane shape of a sector and are each supported by the shoe supporting member or members in a manner to be slightly tiltable with respect to the base 40 as described hereinunder. The shape and the number of the shoes are so selected that the shoes, being arranged around the rotor shaft 9, define a substantially annular bearing surface adapted to cooperate with the annular undersurface of the thrust runner 8.

An embodiment of the shoe assembly 1 is shown in FIGS. 3 and 4. The shoe supporting member 2 is a substantially rectangular spring plate $2c$ which has two linear leg projections $2a$ provided at the opposite ends of a main surface $f$ and a spherical projection $2b$ provided at a central portion of the other main surface $k$ thereof. The shoe supporting member is laid on the base 40 with its leg projections $2a$ abutting thereupon and is supporting the bearing shoe 5 with its central projection $2b$ abutting at the under surface of the shoe. In this shoe assembly, the bearing shoe 5 is tiltable about a point on the undersurface thereof where it is in contact with the spherical projection of the shoe supporting member. However, the shoe supporting member 2 may be positioned inversely as shown in FIG. 5 as another embodiment of the shoe assembly 1 so that the shoe supporting member 2 supports the bearing shoe 5 with its two linear projections $2a$ while itself being supported on the base 40 with its central spherical projection $2b$. In this case, the tilting point of the bearing shoe 5 is lowered from the undersurface thereof by as much as the effective height of the shoe supporting member 2.

It is desirable that the linear leg projections $2a$ have each a rounded contact surface S as shown in FIG. 6, because the leg projections are turned as well as shifted outward by distance $l$ when the shoe supporting member 2 was applied with load W and accordingly it was bent as much as deflection $\delta$ as shown in chain lines in FIG. 6. By the rounded contact surfaces S, the deflection of the shoe supporting member can be smoothly accomplished with less wearing of both contact surfaces. The linear and spherical projections $2a$ and $2b$ may be formed integrally with the spring plate $2c$ but it is desirable that they are made of a less wearing material and attached to the spring plate. In the latter case, it is desirable that the projections are welded to the spring plate to form a unitary member as a final product. As such less wearing materials, hardening steels may preferably be used.

Figure 7:
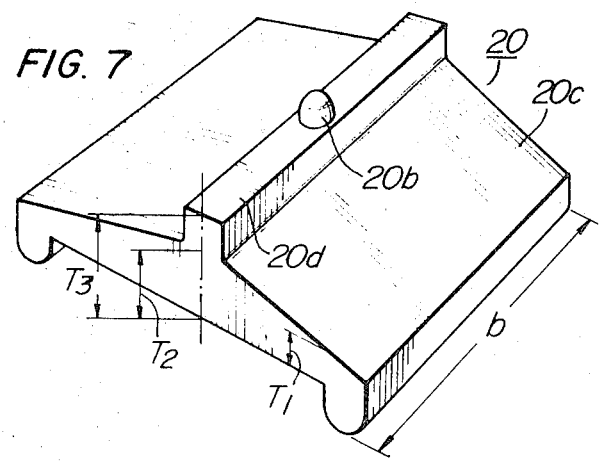
FIG. 7 is a perspective view of another embodiment of the shoe supporting member.

FIG. 7 shows another embodiment of the shoe supporting member which is most advantageous in the view points of strength and deflection. In this shoe supporting member 20, a spring plate $20c$ has a gradually increasing thickness from the edges having linear leg projections $20a$ toward the center thereof where, in addition, a linear beam $20d$ is provided at a main surface opposite to the other main surface having the leg projections $20a$. A central spherical projection $20b$ is provided on the linear beam $20d$ at the central portion thereof. In this embodiment, the central spherical projection may not necessarily be provided, since, especially in case of low speed rotary machines or those subjected to less load fluctuation, the bearing shoe can be laid directly on the linear beam $20d$ with sufficient tilting function of the shoe for such applications.

In the shoe supporting member 20 wherein the thickness of the spring plate $20c$ is gradually increased toward the central portion thereof, the bending stress can be made constant at all portions of the plate if the thickness is properly determined along the length of the plate. On the other hand, the linear beam $20d$ has an effect of uniformly distributing a concentrated load applied to the spherical projection $20b$ along the width $b$ of the spring plate $20c$ so that all portions of the spring plate along the width thereof can function in a most effective manner as a spring.

Figure 8:
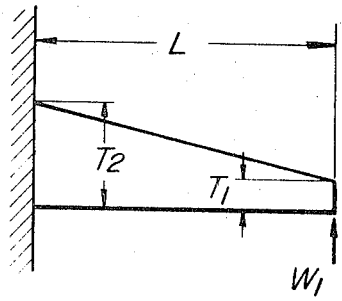
FIG. 8 is a diagrammatic FIG. of a shoe supporting member for evaluating the strength of the member.

As described before, it is required for the thrust bearing assemblies of large rotary machines that they not only have high mechanical strength but also provide large flexibility though these two properties are mutually contradictory. Now, the relation between the strength and the flexibility will be obtained with reference to a simplified model of the shoe supporting member 20 as shown in FIG. 8, wherein a half of the shoe supporting member is considered to be a cantilever, thereby to determine the most advantageous profile of the shoe supporting member. In FIG. 8, L represents the length between the center and the leg projection $20a$ of the spring plate $20c$, and $T_1$ and $T_2$ represent the thickness of the spring plate at the end portion thereof where the leg projection $20a$ is provided and at the center thereof, respectively. $W_1$ is a half of a load which is carried by the shoe supporting member 20, the load being carried by two leg projections $20a$ equally by halves. Assuming that the thickness of the spring plate varies linearly from $T_1$ to $T_2$, the maximum deflection $\delta_{max}$ and the maximum bending stress $\sigma_{max}$ are given as follows:

$$\delta_{max} = \frac{WL^3}{K\delta EI_o} \quad (1)$$

$$\sigma_{max} = \frac{WL}{K_\sigma Z_o} \quad (2)$$

where, $$K\delta = \frac{2(1-\beta)^3}{2\log_e \frac{1}{\beta} - (3-\beta)(1-\beta)}$$

$$K_\sigma = 4\beta(1-\beta), \text{ when } \frac{\beta}{1-\beta} < 1$$

$$K_\sigma = 1, \text{ when } \frac{\beta}{1-\beta} \geq 1$$

$$I_o = \frac{bT_2^3}{12}$$

$$Z_o = \frac{bT_2^2}{6}$$

$$\beta = \frac{T_1}{T_2}$$

$E = $ Young's modulus $b = $ width of the spring plate

For constant values of $b$ and $L$ and by keeping the maximum stress $\sigma_{max}$ to be constant, the maximum deflection $\delta_{max}$ changes according to the ratio $T_1/T_2$ as follows:

| $\beta = T_1/T_2$ | $\beta/1-\beta$ | $K_\sigma$ | $T_2$ | $\sigma_{max}$ | $K\delta$ | $\delta_{max}$ |
|---|---|---|---|---|---|---|
| 1 | ∞ | 1 | 1 | 1 | 3 | 1 |
| 0.9 | 9 | 1 | 1 | 1 | 2.7 | 1.11 |
| 0.8 | 4 | 1 | 1 | 1 | 2.51 | 1.195 |
| 0.7 | 7/3 | 1 | 1 | 1 | 2.31 | 1.3 |
| 0.6 | 6/4 | 1 | 1 | 1 | 2.08 | 1.44 |
| 0.5 | 1 | 1 | 1 | 1 | 1.835 | 1.64 |
| 0.4 | 4/6 | 0.96 | 1.02 | 1 | 1.585 | 1.785 |
| 0.3 | 3/7 | 0.84 | 1.09 | 1 | 1.323 | 1.74 |
| 0.2 | 2/8 | 0.64 | 1.25 | 1 | 1.048 | 1.47 |
| 0.1 | 1/9 | 0.36 | 1.67 | 1 | 0.763 | 0.845 |

Figure 9:
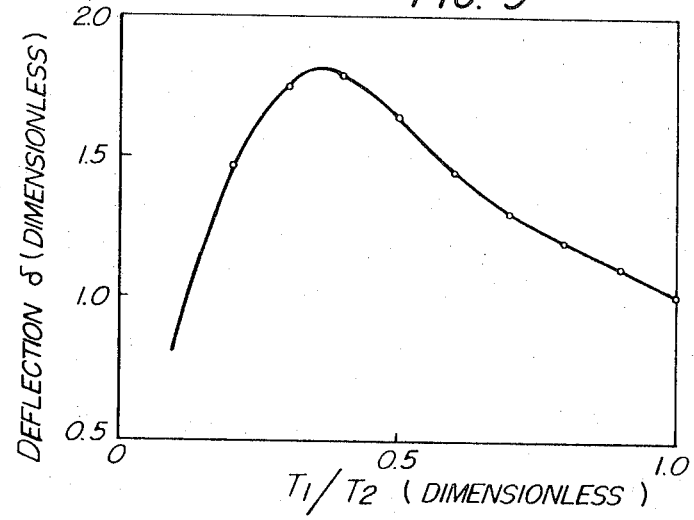
FIG. 9 is a diagram showing the relation between the deflection and the thickness of the spring plate of the shoe supporting member on condition that the bending stress is constant.

The relation between the ratio $T_1/T_2$ and the maximum deflection $\delta_{max}$ obtained in the above is plotted in a diagram of FIG. 9, wherein the abscissa represents the ratio $T_1/T_2$ and the ordinate represents the maximum deflection in a dimensionless scale. From the diagram of FIG. 9, it will be understood that large deflection as compared with bending stress is obtained in the range of $T_1 T_2 = 0.2 ** 0.6$.

Figure 10:
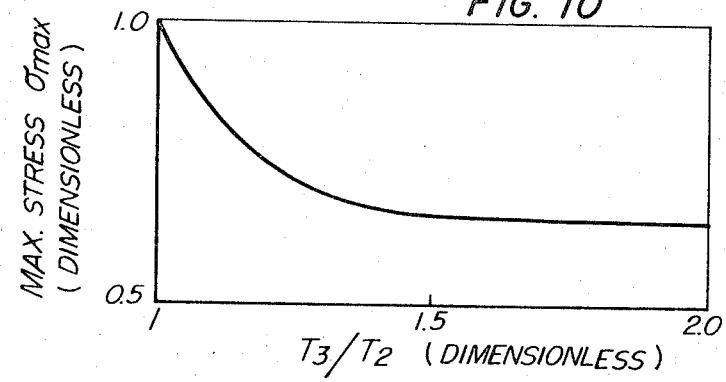
FIG. 10 is a diagram showing the relation between the maximum stress in a beam of the shoe supporting member and the height of the beam.

A diagram of FIG. 10 shows experimental results of the relation between the maximum stress $\sigma_{max}$ and the ratio of the thickness or height $T_3$ of the central linear beam $20d$ (FIG. 7) to the largest thickness $T_2$ of the spring plate $20c$. As it is seen from the diagram, the maximum stress becomes smaller as the ratio $T_3/T_2$ becomes larger. However, since the dimension of the linear beam $20d$ is limited from the practical point of view, it will be most advantageous to select the ratio $T_3/T_2$ to be about 1.3.

Figure 11:
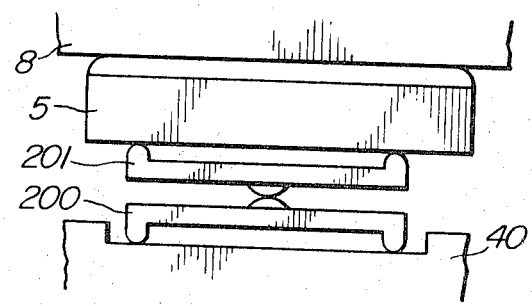
FIG. 11 is a view of the same kind as FIGS. 3 and 5, showing still another embodiment of the shoe assembly.

When a larger deflection is required for the shoe supporting member beyond the limit imposed by a space available or the strength required, a piled assembly of two shoe supporting members as shown in FIG. 11 can be employed, wherein two shoe supporting members 200 and 201 are piled in opposite directions so that they are in contact with each other at their central projections, while they are abutting with their linear leg projections against the base 40 and the bearing shoe 5, respectively. In this case the tilting point of the shoe 5 resides at the contact point of the two shoe supporting members. By the duplicate arrangement, the deflection is doubled for the same maximum stress in each shoe supporting member. Although in the embodiment shown in FIG. 11 the two shoe supporting members are so arranged that they are in contact with each other at their central projections, it is also possible to pile them with their linear leg projections in contact with each other while abutting against the base 40 and the bearing shoe 5 with their central projections. In this case there are provided two tilting points for the bearing shoe 5.

Figure 12:
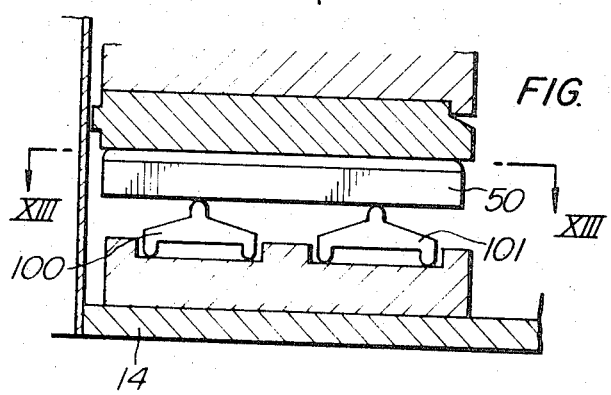
FIG. 12 is a view showing an embodiment of a multiple support shoe assembly.
Figure 13:
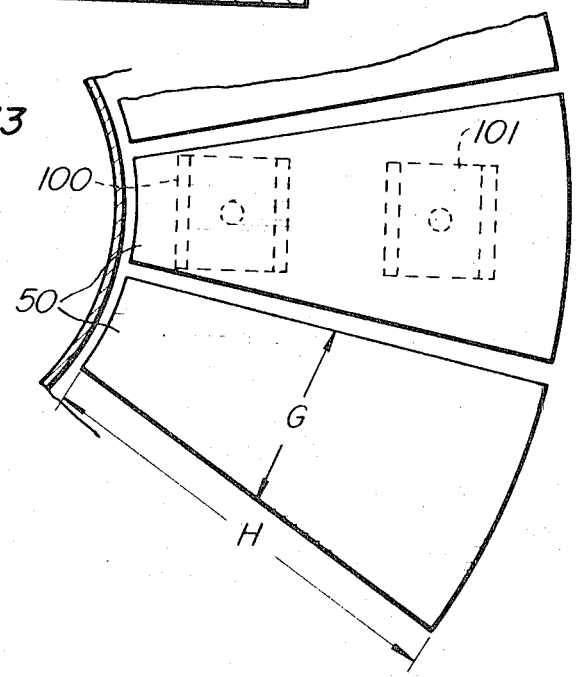
FIG. 13 is a partial plane view taken along line XIII–XIII in FIG. 12.

In a very heavy thrust bearing, the number of separate bearing shoes increases as explained before, and therefore, the plane shape of the bearing shoe becomes a rather radially elongated sector as shown in FIG. 13. If the bearing shoe becomes an elongated one, it is liable to deflect in radial direction, whereby it becomes very difficult, including difficulties in manufacture, to obtain a shoe assembly wherein a uniform distribution of the load over the whole surface of the shoe is accomplished. Such difficulties, however, are readily solved by an embodiment of this invention as shown in FIGS. 12 and 13.

Figure 14:
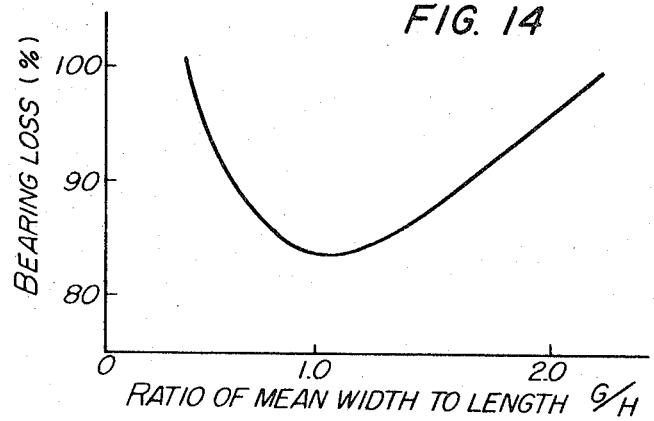
FIG. 14 is a diagram showing the relation between the bearing loss and the plane shape of the bearing shoe.
Figure 15:
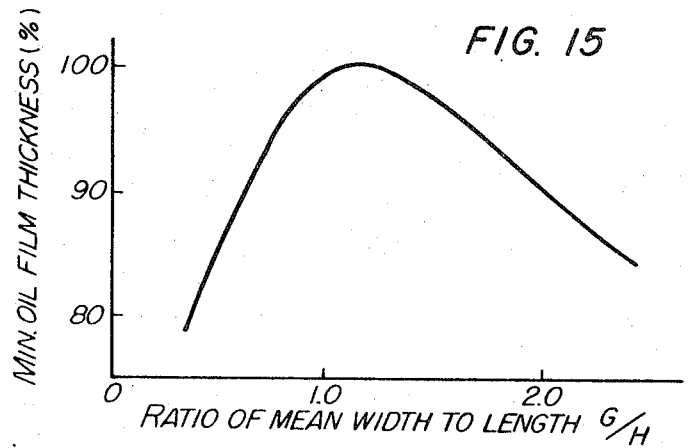
FIG. 15 is a diagram showing the relation between the minimum thickness of oil film and the plane shape of the bearing shoe.

A bearing shoe 50 having a plane shape of a radially elongated sector is liable to deflect in radial direction due to thermal deformation as well as pressure deformation, if it is supported at a point along its radical length, since the oil film pressure applied on the upper surface of the shoe is not sufficiently supported at portions remote from the supporting point. As the results of some experiments conducted by us, it was known that, if the ratio G/H of the circumferential mean width G of the sectoral shoe to the radial length L thereof becomes smaller than 1, the minimum thickness of the oil film decreases abruptly, thereby increasing the bearing loss as shown in diagrams of FIGS. 14 and 15. These diagrams are showing the bearing loss and the minimum thickness of oil film in relation to the ratio G/H, wherein temperature rise of the oil film is disregarded. From these diagrams, it will be understood that the maximum thickness of oil film is obtained and accordingly the bearing loss is minimum when the ratio G/H is about 1 or the shoe is nearly square.

Depending upon these facts, the embodiment of this invention shown in FIGS. 12 and 13 is provided with a plurality of or two shoe supporting members 100 and 101 for each bearing shoe 50, which are arranged in radial direction. Each shoe supporting member 100 or 101 may be the same as the shoe supporting member 2 or 20, or it may be such a combination of the shoe supporting members 200 and 201. The two shoe supporting members 100 and 101 are preferably so positioned that they support the bearing shoe at respective centers of gravity of imaginarily divided sectors each having the same G/H ratio.

Figure 16:
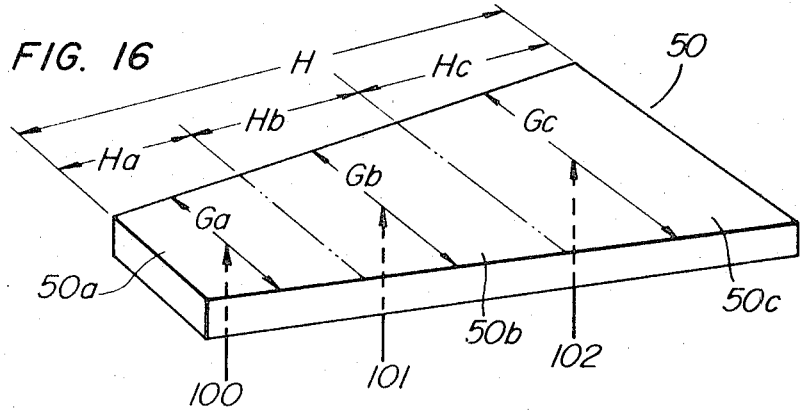
FIG. 16 is an explanatory FIG. of an elongated bearing shoe adapted for the multiple supporting.

Although two shoe supporting members are used for one bearing shoe in the embodiment shown in FIGS. 12 and 13, the number of shoe supporting members to be used for supporting one bearing shoe along radial direction thereof may be more than two according to the G/H ratio of the sectoral shoe. The manner of providing such plurality of shoe supporting members will be explained in more detail with reference to FIG. 16. In FIG. 16, a relatively elongated sectoral shoe 50 is supported by three shoe supporting members 100, 101 and 102, though these members are shown by three arrowheads for the purpose of simplicity. In this case, the shoe 50 is first determined of its width and length in such a manner that, when it is imaginarily divided into three sectoral portions $50a$, $50b$ and $50c$ all of the ratios $Ga/Ha$, $Gb/Hb$ and $Gc/Hc$ have a value substantially equal to 1 or the portions $50a$, $50b$ and $50c$ are all nearly squares. Then, the three shoe supporting members 100, 101 and 102 are so arranged that they respectively support the three sectoral portions at their centers of gravity. Since each sectoral portion has the ideal G/H ratio substantially equal to 1, it is guaranteed that the most preferable oil film is generated on each portion, and accordingly the shoe 50, which is a simple addition of respective portions, operates under the most preferable oil film condition over the whole surface thereof. Thus, according to this invention, even a very elongated bearing shoe can be effectively supported so as to be operated in the most preferable condition with the minimum bearing loss. The shoe supporting members of this triple shoe assembly or any further multiple shoe assembly may of course be either of those shown in FIGS. 4, 7 and 11. Furthermore, it is also possible to use several types of shoe supporting members in combination according to particular conditions of bearings.

As described in the above, a number of sectoral bearing shoes are, according to this invention, supported by the special shoe supporting members under a sufficient flexibility provided by these members, whereby the bearing shoes are all operated under a substantially equal oil film pressure, thus carrying substantially same partial charges of the load applied to the thrust bearing. On the other hand, each partial charge is distributed highly uniformly over the all surface of each bearing shoe, whereby the most preferable operation with the minimum bearing loss can be accomplished. Furthermore, although it is very desirable that all of the bearing shoes are installed to define a perfectly plane bearing surface, a relatively large tolerance is available because of a large flexibility obtained by the shoe supporting members of this invention. This fact releases us in the manufacture of large thrust bearing assemblies from high precision manufacture of the parts or laborious works of assembly including manual finishing and filing.

It will also be appreciated that the thrust bearing assembly of this invention is especially advantageously used in a large or very large rotary machine with its ability of carrying a heavy load by a number of separate bearing shoes in a very uniform manner, each bearing shoe in turn carrying its partial charge uniformly over the whole surface thereof even if the bearing shoe has a plane shape of a relatively elongated sector caused by the need that the annular bearing surface must be divided into a large number of sectoral shoes in order to support a very heavy load.

Although several particular embodiments of this invention were described in the above for the purpose of illustrating this invention, it is to be understood that this invention is not limited to these embodiments but many other embodiments are possible without departing from the spirit of this invention which is defined in the following claims.

We claim:

1. A thrust bearing assembly for use in vertical rotary machines, comprising an annular thrust member mounted on a rotor shaft of the machine, a plurality of separate bearing shoes adapted to cooperate with and slidingly support said thrust member, and a plurality of shoe supporting members for supporting said bearing shoes against a base finally supported on the ground, each one of said bearing shoes being supported by at least one of said shoe supporting members, characterized in that said shoe supporting member is a spring plate having leg projections on one main surface and at opposite ends thereof and a central projection on the other main surface and at a central portion thereof.

2. A thrust bearing assembly according to claim 1, wherein said leg projections are linear projections extending substantially in parallel with each other.

3. A thrust bearing assembly according to claim 1, wherein said central projection is a substantially spherical projection.

4. A thrust bearing assembly according to claim 1, wherein a linear beam is provided through said central portion substantially in parallel with said opposite ends.

5. A thrust bearing assembly according to claim 1, wherein the thickness of said spring plate is gradually increased from said opposite ends toward said central portion.

6. A thrust bearing assembly according to claim 1, wherein said projections are made of a less wearing material than the material of said spring plate.

7. A thrust bearing assembly according to claim 1, wherein said shoe supporting members are used in oppositely piled condition.

8. A thrust bearing assembly according to claim 1, wherein more than one shoe supporting members are arranged along each bearing shoe for supporting the same.

9. A thrust bearing assembly according to claim 1, wherein said thrust member, bearing shoes and shoe supporting members are housed in an oil vessel filled with a lubricating oil.

10. A thrust bearing assembly according to claim 2, wherein said linear projections have each a rounded edge.

11. A thrust bearing assembly according to claim 5, wherein the thickness of said spring plate is linearly increased from said opposite ends toward said central portion so that the ratio of the thickness at said opposite ends to the thickness at said central portion is in the range of 0.2 to 0.6.

12. A thrust bearing assembly according to claim 4, wherein the ratio of the thickness including the thickness of said beam and that of said central portion of said spring plate to the pure thickness of said central portion of said spring plate is substantially 1.3.

13. A thrust bearing assembly according to claim 3, wherein each bearing shoe has a plane shape of a sector having length and mean width which are substantially equal to each other and is supported at its center of gravity by said central projection.

14. A thrust bearing assembly according to claim 3, wherein each bearing shoe has a plane shape of a sector which can be imaginarily divided into a plurality of sectors each having length and mean width which are substantially equal to each other, said plurality of sectors each being supported at its center of gravity by said central projection.